Patented July 25, 1950

2,516,635

UNITED STATES PATENT OFFICE 2,516,635

BROMOETHYL HYDANTOIN AND METHOD OF MAKING SAME

John E. Livak, Clemson, S. C., and Edgar C. Britton, Midland, Mich., assignors to The Dow Chemical Company, Midland, Mich., a corporation of Delaware No Drawing. Application November 7, 1946, Serial No. 708,468

4 Claims. (Cl. 260—309.5)

This invention concerns a new compound, 5-(beta-bromoethyl) hydantoin, and a method of making the same.

The 5-(beta-bromoethyl) hydantoin is useful as an intermediate in the production of methionine by a method set forth in a journal article, J. A. C. S. 67 2218 (1945), of which we are co-authors with others.

We have found that 5-(beta-bromoethyl) hydantoin may be prepared by reacting alpha-amino-gamma-hydroxy-butyric acid with an alkali metal cyanate to form a corresponding salt of gamma-hydroxy-alpha-ureido-butyric acid, acidifying the latter with an excess of hydrobromic acid over the amount necessary to liberate the gamma-hydroxy-alpha-ureido-butyric acid from its salt, and heating the acidified mixture to cause formation of the 5-(beta-bromoethyl) hydantoin product. The reactions are carried out in the presence of water as a reaction medium.

In preparing 5-(beta-bromoethyl) hydantoin by the method just outlined, an aqueous solution of alpha-amino-gamma-hydroxy-butyric acid and an alkali metal cyanate, e. g. sodium or potassium cyanate, is heated to a temperature sufficient to cause fairly rapid reaction. The alpha-amino-gamma-hydroxy-butyric acid and the alkali metal cyanate are preferably employed in approximately equimolecular proportions, but either may be used in excess if desired. For instance, from 0.5 to 2 molecular equivalents of the alpha-amino-gamma-hydroxy-butyric acid may be employed per mole of the alkali metal cyanate. Water is preferably present in amount such as to form a fairly concentrated solution of the reacting materials, but it may be used in as large a proportion as desired. In most instances, we employ from 3 to 5 parts by weight of water per part of the alpha-amino-gamma-hydroxy-butyric acid.

The reaction between alpha-amino-gamma-hydroxy-butyric acid and alkali metal cyanate takes place quite rapidly on heating the reaction mixture at temperatures of from 40° to 100° C., and it may be accomplished at somewhat lower temperatures, or under pressure at higher temperatures. Usually, the mixture is warmed to temperatures of from 50° to 75° C. for from 1 to 3 hours.

The alkali metal salt of gamma-hydroxy-alpha-ureido-butyric acid thereby formed is a new compound which may, if desired, be isolated. Also, the salt, or a solution thereof, may be treated with a strong mineral acid, such as hydrochloric acid or hydrobromic acid, etc., to obtain gamma-hydroxy-alpha-ureido-butyric acid in free form. However, these compounds are intermediates in the preparation of the desired 5-(beta-bromoethyl) hydantoin, and they usually are not isolated from the mixtures in which they are formed.

Instead, the mixture obtained by heating the aqueous solution of alpha-amino-gamma-hydroxy-butyric acid and the alkali metal cyanate is treated with hydrogen bromide, or hydrobromic acid, in amount sufficient to render it strongly acidic. The mixture is evaporated, if necessary, to bring it to a concentration sufficient for crystallization of a major part of the alkali metal bromide which is formed and the crystalline bromide is removed, e. g. by filtration. The remaining solution is usually again enriched with HBr and further evaporated, preferably under vacuum, to crystallize a second crop of material therefrom. Such evaporation and crystallization operations are repeated as necessary to remove the alkali metal bromide as the earlier fractions of crystals and to obtain crystalline 5-(beta-bromoethyl) hydantoin as subsequent fractions. The 5-(beta-bromoethyl) hydantoin thus obtained is purified by recrystallization from water or other suitable solvent, e. g. ethyl alcohol. It is obtained in the form of white crystals having a melting point of approximately 141°–143° C. The total amount of hydrobromic acid employed in preparing the product corresponds to at least twice the molecular equivalent of the alpha-amino-gamma-hydroxy-butyric acid starting material and is usually in considerable excess over this proportion.

As a method alternative to that just described, we have found that the compound, 5-(beta-bromoethyl) hydantoin may also be prepared in good yield by heating the cyclopropanespirohydantoin disclosed by Ingold et al., J. C. S. 121 1190 (1922), together with about three-fold its weight or more of a concentrated aqueous hydrobromic acid solution at a temperature of from 100° to 130° C. or higher for an hour or more. Thereafter, the hydrobromic acid is removed by evaporation and the residual 5-(beta-bromoethyl) hydantoin is purified by recrystallization, e. g. from water or ethanol. Because of inconveniences involved in preparing the cyclopropanespirohydantoin starting material, we preferably prepare the 5-(beta-bromoethyl) hydantoin by the first of the above-described methods.

The following examples describe certain ways in which the principle of the invention has been

Example 1

A solution of 13 grams (0.16 mole) of potassium cyanate in 25 cubic centimeters of water was added to a solution of 17.9 grams (0.15 mole) of alpha-amino-gamma-hydroxy-butyric acid in 75 cubic centimeters of water. The mixture was heated with stirring at a temperature of 65° C. for 2 hours. It was then cooled and the resultant solution of potassium gamma-hydroxy-alpha-ureido-butyrate was treated with 100 cubic centimeters of an aqueous hydrobromic acid solution of 48 percent concentration. The acidified mixture was heated at a temperature of 90° C. for 2 hours, after which it was evaporated at 15 millimeters absolute pressure substantially to dryness. The residue was digested with 150 cubic centimeters of acetone and filtered to remove undissolved potassium bromide. The filtrate was evaporated to dryness and the residue was treated with 100 cubic centimeters of aqueous hydrobromic acid solution of 48 per cent concentration. The resultant mixture was heated at 90° C. for 2 hours, after which the hydrobromic acid was distilled therefrom under vacuum. A dark-colored gel, which remained as a residue, was dissolved in 100 cubic centimeters of hot water and the solution was cooled to crystallize the 5-(beta-bromoethyl) hydantoin product. The latter was purified by recrystallization from water. There was obtained 16 grams of white, crystalline 5-beta-bromoethyl) hydantoin having a melting point of 141.5°–142° C. The yield was 51.5 per cent of theoretical.

Example 2

A mixture of 5 grams (0.04 mole) of 5-cyclopropanespirohydantoin and 15 cubic centimeters of an aqueous hydrobromic acid solution of 66 per cent concentration was heated at a temperature of 120° C. for 1 hour. The mixture was then distilled at 20 millimeters absolute pressure to remove the hydrobromic acid. The residual solid material was recrystallized from ethyl alcohol. There was obtained 7.3 grams of white, crystalline 5-(beta-bromoethyl) hydantoin having a melting point of 141°–142° C. The yield was 87 per cent of theoretical.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. 5-(beta-bromoethyl) hydantoin, a crystalline compound having a melting point of approximately 141°–143° C.

2. In a method of making 5-(beta-bromoethyl) hydantoin, the steps which consist in reacting an alkali metal cyanate with alpha-amino-gamma-hydroxy-butyric acid in the presence of water as a reaction medium to form a salt of gamma - hydroxy - alpha - ureido - butyric acid, acidifying the resultant mixture with hydrobromic acid, heating the acidified mixture to cause formation of 5-(beta-bromoethyl) hydantoin, and separating the latter from the mixture.

3. In a method of making 5-(beta-bromoethyl) hydantoin, the steps of heating an aqueous solution of approximately equimolecular amounts of an alkali metal cyanate and alpha-amino-gamma-hydroxy-butyric acid to a reaction temperature between 50° and 100° C., thereafter acidifying the mixture with hydrobromic acid, heating the acidified mixture at temperatures of from 70°–100° C. to cause formation of 5-(beta-bromoethyl) hydantoin, and crystallizing the latter from the mixture.

4. A method, as described in claim 3, wherein the alkali metal cyanate is potassium cyanate.

JOHN E. LIVAK.
EDGAR C. BRITTON.

REFERENCES CITED

The following references are of record in the file of this patent:

Jr. Organic Chemistry (Henze et al.), Jan. 1943, pp. 17–28.

JACS, vol. 67, Dec. 1945, pages 2218–2220.